US012059784B2

(12) United States Patent
Lamb

(10) Patent No.: US 12,059,784 B2
(45) Date of Patent: Aug. 13, 2024

(54) CLINCH FASTENER SYSTEM

(71) Applicant: PNEUTOOLS, INC., Arlington, TN (US)

(72) Inventor: Frederick William Lamb, McDonald, PA (US)

(73) Assignee: PNEUTOOLS, INC., Arlington, TN (US)

( * ) Notice: Subject to any disclaimer, the term of this patent is extended or adjusted under 35 U.S.C. 154(b) by 0 days.

(21) Appl. No.: 18/233,950

(22) Filed: Aug. 15, 2023

(65) Prior Publication Data

US 2024/0058930 A1 Feb. 22, 2024

Related U.S. Application Data

(63) Continuation of application No. 16/847,161, filed on Apr. 13, 2020, now Pat. No. 11,766,771.

(60) Provisional application No. 62/932,523, filed on Nov. 8, 2019, provisional application No. 62/927,843, filed on Oct. 30, 2019, provisional application No. 62/832,306, filed on Apr. 11, 2019.

(51) Int. Cl.
*B25C 1/04* (2006.01)
*B25C 1/00* (2006.01)

(52) U.S. Cl.
CPC .............. *B25C 1/043* (2013.01); *B25C 1/008* (2013.01); *B25C 1/047* (2013.01)

(58) Field of Classification Search
CPC ......... B25C 1/043; B25C 1/008; B25C 1/047; B25C 7/00; B25C 1/04; B25C 1/06; B25C 1/041; B27F 7/09; B27F 7/34
See application file for complete search history.

(56) References Cited

U.S. PATENT DOCUMENTS

| | | | | |
|---|---|---|---|---|
| 2,943,327 | A | 7/1960 | Juilfs | |
| 3,734,378 | A | 5/1973 | Rice et al. | |
| 4,011,785 | A | 3/1977 | Schrepferman | |
| 6,431,428 | B1 | 8/2002 | Chen | |
| 7,556,183 | B1 * | 7/2009 | Liang | B25C 1/008 227/129 |
| 9,993,913 | B2 | 6/2018 | McCardle et al. | |

(Continued)

OTHER PUBLICATIONS

International Search Report and Written Opinion for corresponding International Application No. PCT/US20/27956 dated Jul. 24, 2020.

(Continued)

*Primary Examiner* — Veronica Martin
(74) *Attorney, Agent, or Firm* — Reed Smith LLP

(57) ABSTRACT

A clinch fastener mechanism including a pivoting base configured to be pivotally connected to a pneumatic fastener tool. The clinch fastener mechanism further includes a clinch arm pivotally connected to the pivoting base at a proximal end of the clinch arm; and a clinch plate disposed on a distal end of the clinch arm, wherein tool operates within three pressure zones. The system may also include a two-valve system which works by moving pressure throughout three specific zones. The first pressure zone has pressure introduced to it by the user attaching the tool to a pressure delivery source, such as a compressor, or other source. The second pressure zone may be used to operate the clinch arm or a safety mechanism. Mechanical safeties may be configured to prevent accidental or double firing of the tool.

15 Claims, 15 Drawing Sheets

(56) References Cited

U.S. PATENT DOCUMENTS

| | | | | |
|---|---|---|---|---|
| 2004/0031839 | A1 | 2/2004 | Pruyne | |
| 2006/0071047 | A1 | 4/2006 | Aguirre et al. | |
| 2008/0290131 | A1 | 11/2008 | Liang et al. | |
| 2009/0159633 | A1 | 6/2009 | Wu | |
| 2014/0076954 | A1 | 3/2014 | Miller et al. | |
| 2014/0209657 | A1* | 7/2014 | Huang | B27F 7/09 227/19 |
| 2018/0354112 | A1 | 12/2018 | Huang et al. | |

OTHER PUBLICATIONS

International Search Report and Written Opinion for International Application No. PCT/US20/20091 dated Nov. 27, 2020.

Search Report and Written Opinion for European Application No. 20788346 dated Dec. 16, 2022.

"Polyamide Fibers (Nylon)" (Polymer Properties Database(online)(retrieved from the internet on Jun. 11, 2020: https://web.archive.org/web/20170311172258/https://polymerdatabase.com/Fibers/Nylon.html.Mar. 11, 2017; entire document, especially paragraph 3.

* cited by examiner

CLINCH FASTENER SYSTEM

CROSS-REFERENCE TO RELATED APPLICATION

This application is a continuation application of U.S. patent application Ser. No. 16/847,161 filed Apr. 13, 2020 which claims the benefit under 35 U.S.C. § 119(e) of the earlier filing date of U.S. Provisional Patent Application No. 62/832,306 filed on Apr. 11, 2019; U.S. Provisional Patent Application No. 62/927,843 filed on Oct. 30, 2019; and U.S. Provisional Patent Application No. 62/932,523 filed on Nov. 8, 2019, the disclosures of which are incorporated by reference herein.

BACKGROUND

Exemplary embodiments disclosed herein relate to clinch fastener systems having clinch fastener mechanisms for use with pneumatic fastener tools such as pneumatic nail guns or pneumatic stapler guns.

A pneumatic tool has a trigger that is typically standalone in its function. When a user depresses the trigger, it actuates a pneumatic trigger valve seated behind the trigger, which begins the pneumatic cycle in the tool housing to allow for a piston driver to stroke once and drive a fastener.

Clinch fastener mechanisms used with pneumatic fastener tools are typically used in pallet industries, for example, so that the fastener is not exposed, and so that the clinched fastener provides greater holding power.

Typical clinch fastener mechanisms have long exposed hoses that are ported into the housing of the tool in multiple areas. The purposes of the hoses are to tap into the air supply inside of the tool to then provide a particular sequence of airflow that allows for a clinch arm of the clinch fastener mechanism below the nose of the tool to be actuated for the fastening of a fastener. The hoses are prone to being torn off during use because they are unprotected, and dirt and water that enters the tools hoses can greatly effect the tools operation, causing it to slow down and even jam or stop working. On top of this, having only pneumatic hoses to provide the clinch actuation creates a safety hazard, as the user only must pull the trigger to pneumatically actuate the clinch sequence. This creates a risk of a user pinching themselves with the pneumatically actuated clinch arm and puts them at risk of firing a fastener into the clinch arm outside of the pallet material, thereby creating a ricochet of a fastener.

There are many types of triggers for pneumatic tools in the marketplace. Most are single trigger and single trigger valve tools. Some are two-valve tools. The first valve is the trigger valve, which houses a ball seal, trigger valve, and valve plunger. The second valve is the safety valve, which houses a valve head, and valve plunger, and valve plunger spring.

The two-valve system works by moving pressure throughout three specific zones. The first pressure zone has pressure introduced to it by the user attaching the tool to a pressure delivery source, such as a compressor, or other source.

Among these trigger types are a multitude of safeties added to the trigger or externally attached to the housing of the tool.

BRIEF DESCRIPTION OF THE DRAWINGS

Various embodiments of the disclosure are described herein in by way of example in conjunction with the following figures, wherein like reference characters designate the same or similar elements.

DETAILED DESCRIPTION

Figure 1:
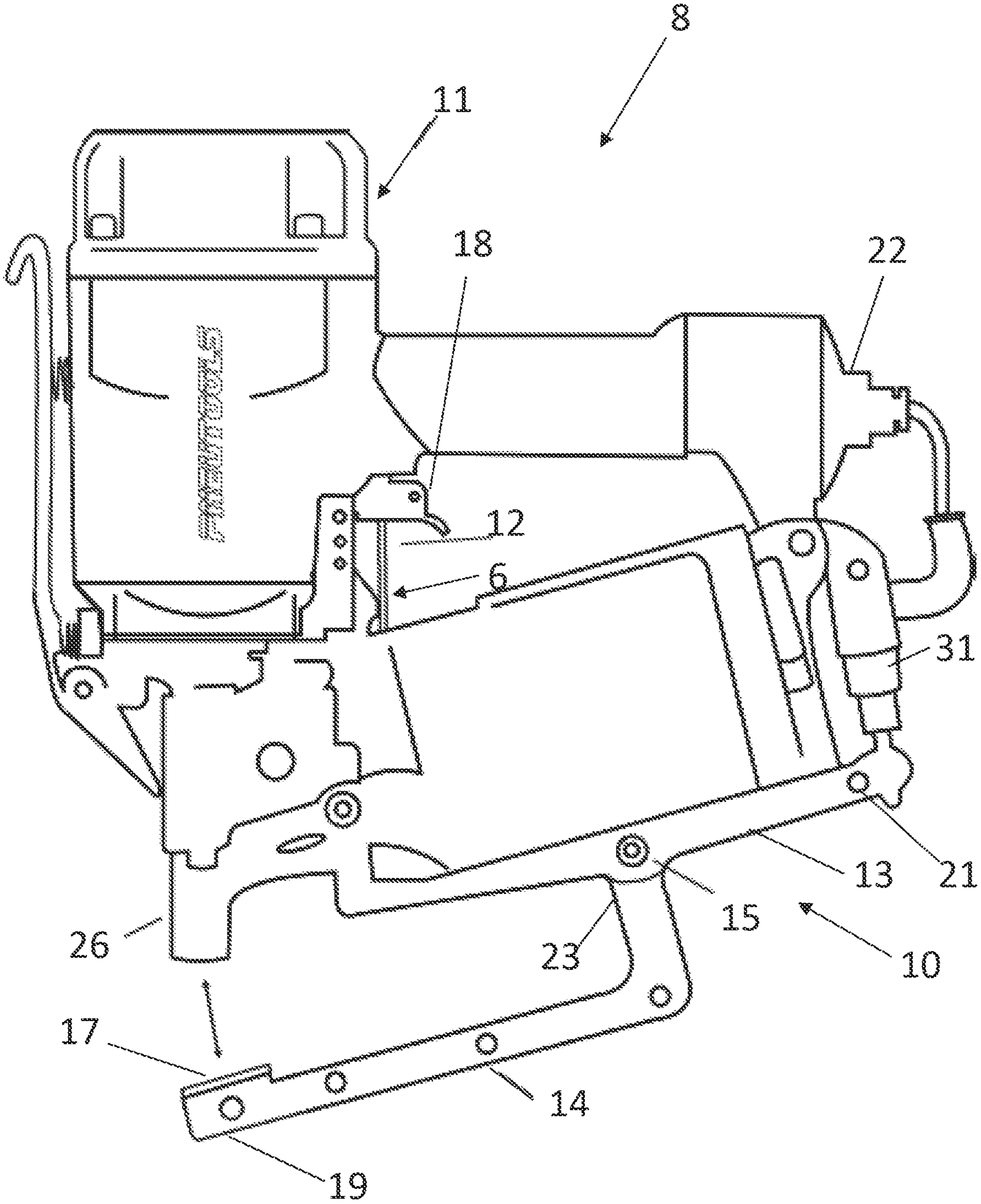
FIG. 1 is a side view of a clinch fastener system according to embodiments of the disclosure.

Exemplary embodiments disclosed herein relate to clinch fastener systems 8 having clinch fastener mechanisms 10 for use with pneumatic fastener tools 11 such as pneumatic nail guns or pneumatic staplers. Referring to FIGS. 1-15, a clinch fastener mechanism 10 according to the exemplary embodiments of the disclosure is a piece of equipment for attaching to pneumatic fastener tools 11. Clinch fastener mechanism 10 includes a pivoting base 13 for the pneumatic fastener tool 11 to attach to, a clinch arm 14 that holds a clinch plate 17 on a distal end 19 of clinch arm 14. Pneumatic fastener tool 11 is pivotally connected to pivoting base 13 at pivoting base pivot point 21. Clinch arm 14 is pivotally connected at a proximal end 23 thereof to pivoting base 13 at clinch arm pivot point 15. Exemplary embodiments of this disclosure allow for the clinching of material between clinch plate 17 and a tool nose 26 of pneumatic fastener tool 11 with a fastener (not shown) released from tool nose 26.

The clinch fastener mechanism 10 is used by attaching a pneumatic fastening tool 11 to pivoting base 13 and to an air supply attachment 22 configured for receiving air from the pneumatic fastening tool 11. Once the pneumatic stapling tool 11 is attached to pivoting base 12, it is usable for clinching material such as two pieces of wood together, for example. The user inserts clinch arm 14 so that the clinched material is positioned between clinch plate 17 and tool nose 26 of pneumatic fastening tool 11. Then the user presses downward on pneumatic fastening tool 11 and pulls the trigger 18 on the pneumatic fastening tool 11. This sends air to air supply attachment 22, which then activates a pivot actuating air cylinder 31, which causes clinch arm 14 to clinch upwards, thereby pressing the clinched material together at the same time a fastener is dispensed or fired down from the pneumatic fastener tool 11 and through the clinched material. As the fastener goes through the clinched material, the end(s) of the fastener are clinched by clinch plate 17 by being bent or diverted, for example, by clinch plate 17. Releasing trigger 18 of pneumatic stapling tool 11 allows for clinch arm 14 to release the clinched material so the next fastener can be dispensed.

Referring to FIGS. 1-10, the clinch fastener mechanism 10, according to the disclosed embodiments, includes a mechanically actuated trigger linkage 12 which does away with the need for multiple hoses, enables the pneumatic fastener tool 11 to have a longer life, makes it less prone to breaking, and provides an additional safety feature that prevents the unintended clinch of the pneumatic fastener tool 11. The mechanically actuated trigger linkage 12 of the tool 10 includes a mechanical trigger linkage system 6 that has an integrated actuator arm 16 that is now a part of the trigger 18, a safety trigger lockout mechanism 20, a pneumatic valve actuating arm 32, and the pneumatic clinch actuating valve 24.

Figure 2:
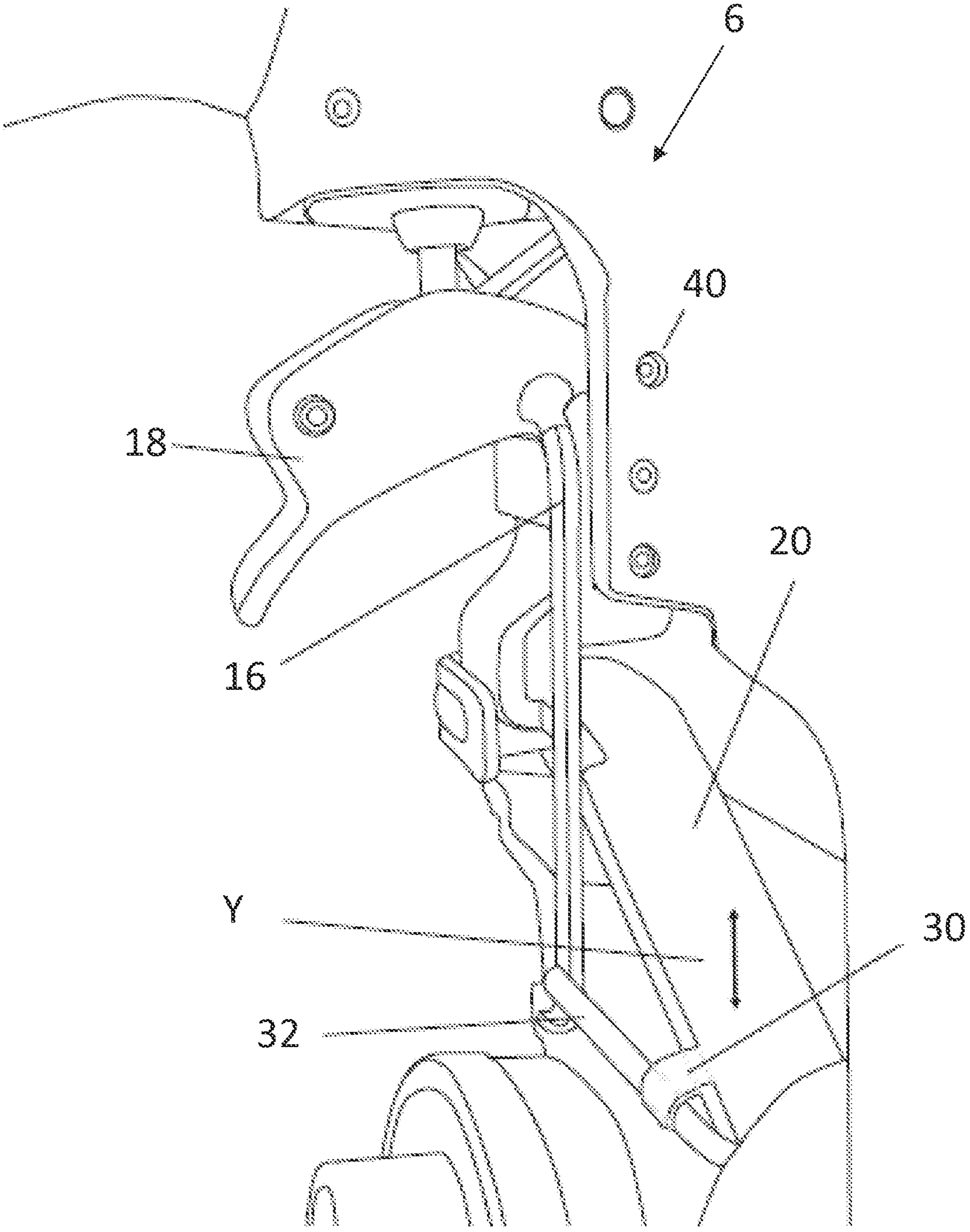
FIG. 2 is a partial perspective view of the clinch fastener system of FIG. 1 showing the safety trigger lockout mechanism.
Figure 7:
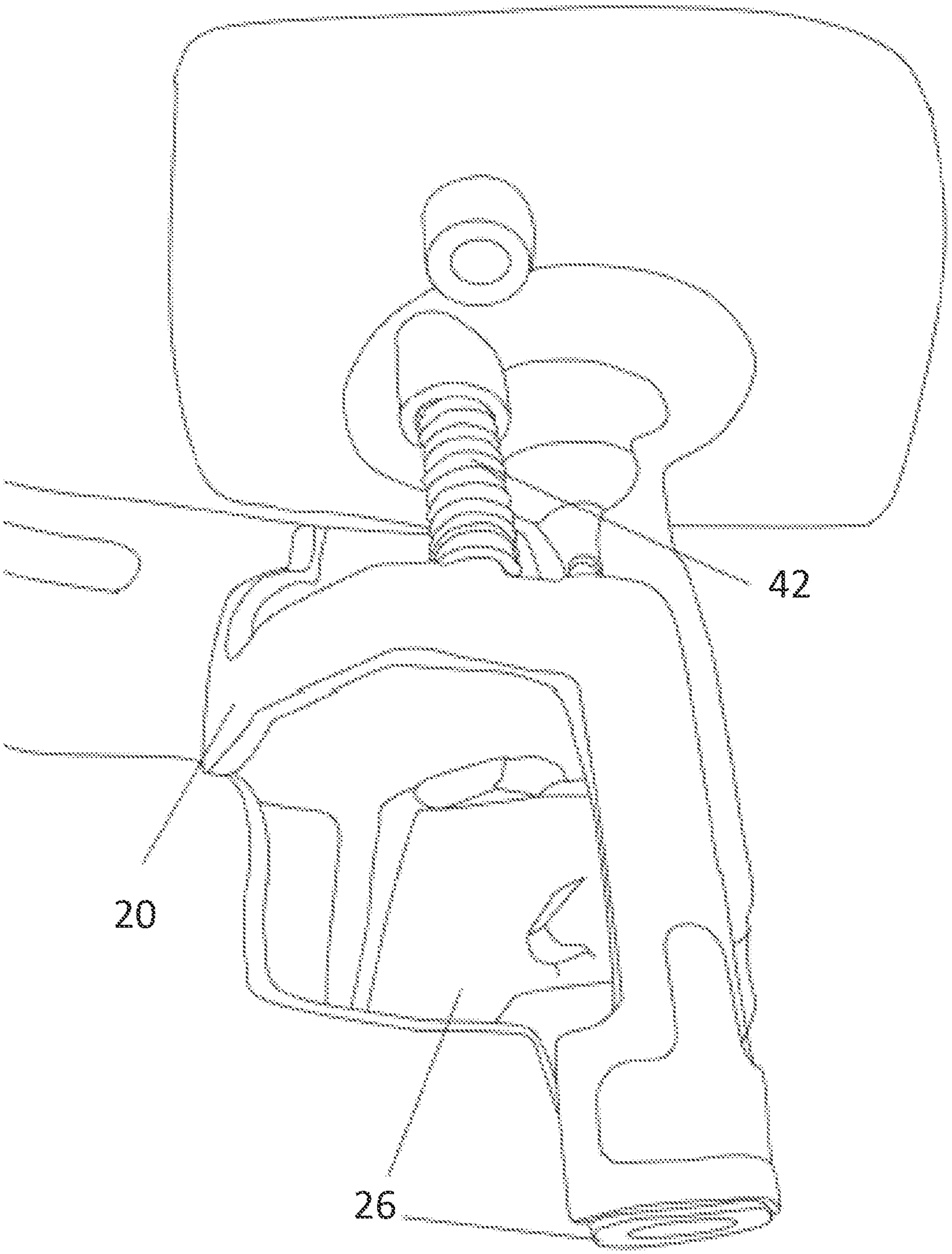
FIG. 7 is a partial perspective view of the clinch fastener system of FIG. 1. showing the safety trigger lockout mechanism in a sprung up depressed position.
Figure 8:
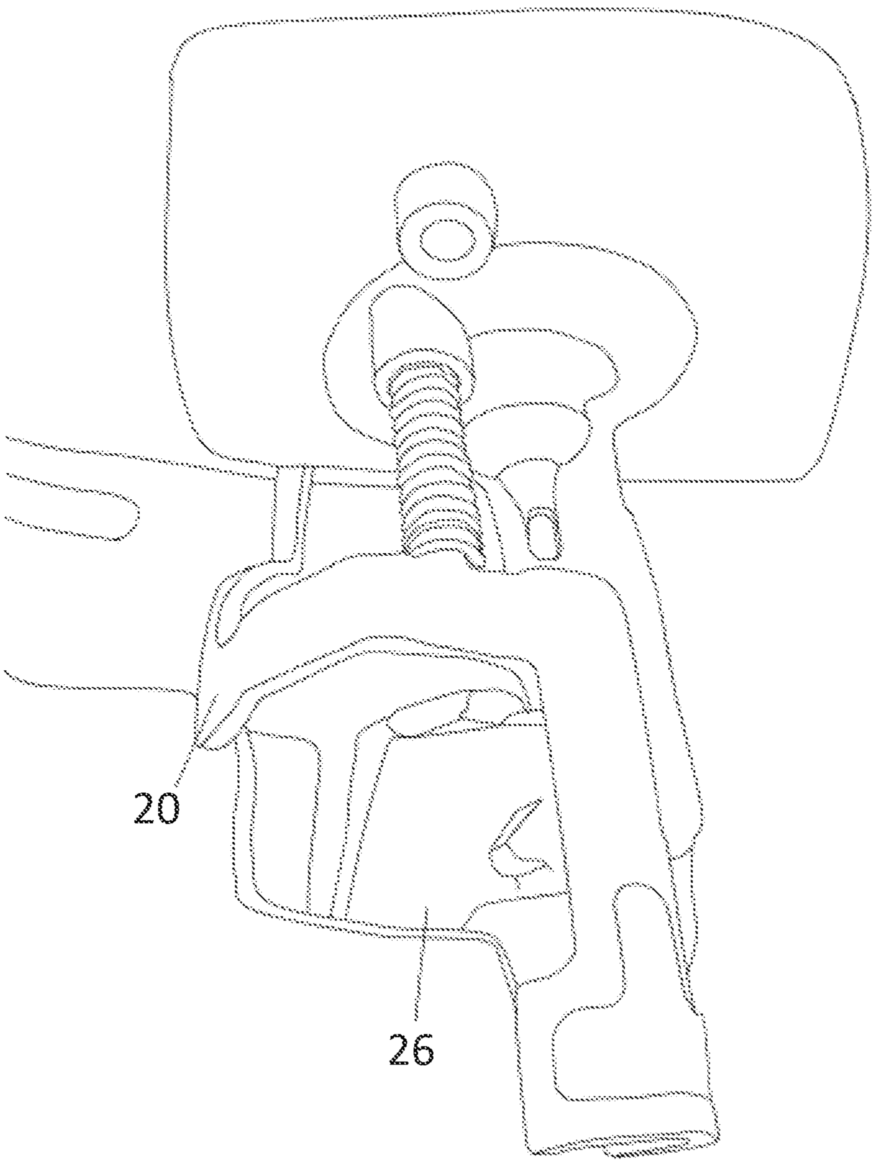
FIG. 8 is a partial perspective view of the clinch fastener system of FIG. 1. showing the safety trigger lockout mechanism in a sprung down position.

The safety trigger lockout mechanism 20 is a stamped piece of steel, for example, that has a lockout flange 30 that wraps around the pneumatic valve actuating arm 32 when the tool nose 26 is not depressed. The safety trigger lockout mechanism 20 also wraps around the tool nose 26 and sits below the end of the tool nose 26 (FIGS. 7-8). It has a spring 42 (FIGS. 7-8) attached to it that keeps it sprung down. The safety trigger lockout mechanism 20 is vertically moveable in direction Y (FIG. 2). When the user depresses tool nose 26, safety trigger lockout mechanism 20, which is a modified wear contact element, touches the work surface of the clinched material before tool nose 26 does. As it touches the work surface, spring 42 compresses and the safety trigger lockout mechanism 20 rises up vertically along tool nose 26 until the surface of tool nose 26 touches the work surface. In this depressed state, the lockout piece of safety trigger mechanism 20 has risen, thereby releasing integrated actuator arm 16, making it free to be actuated by mechanically actuated trigger linkage 12.

When tool nose 26 is depressed, safety trigger lockout mechanism 20 vertically ascends (FIG. 4) and releases pneumatic valve actuating arm 32 so that it can pivot about pivot 44 (FIG. 5) when the user pulls/depresses trigger 18 by squeezing the user's hand around trigger 18 so that trigger 18 pivots upwardly about pivot 40.

Figure 3:
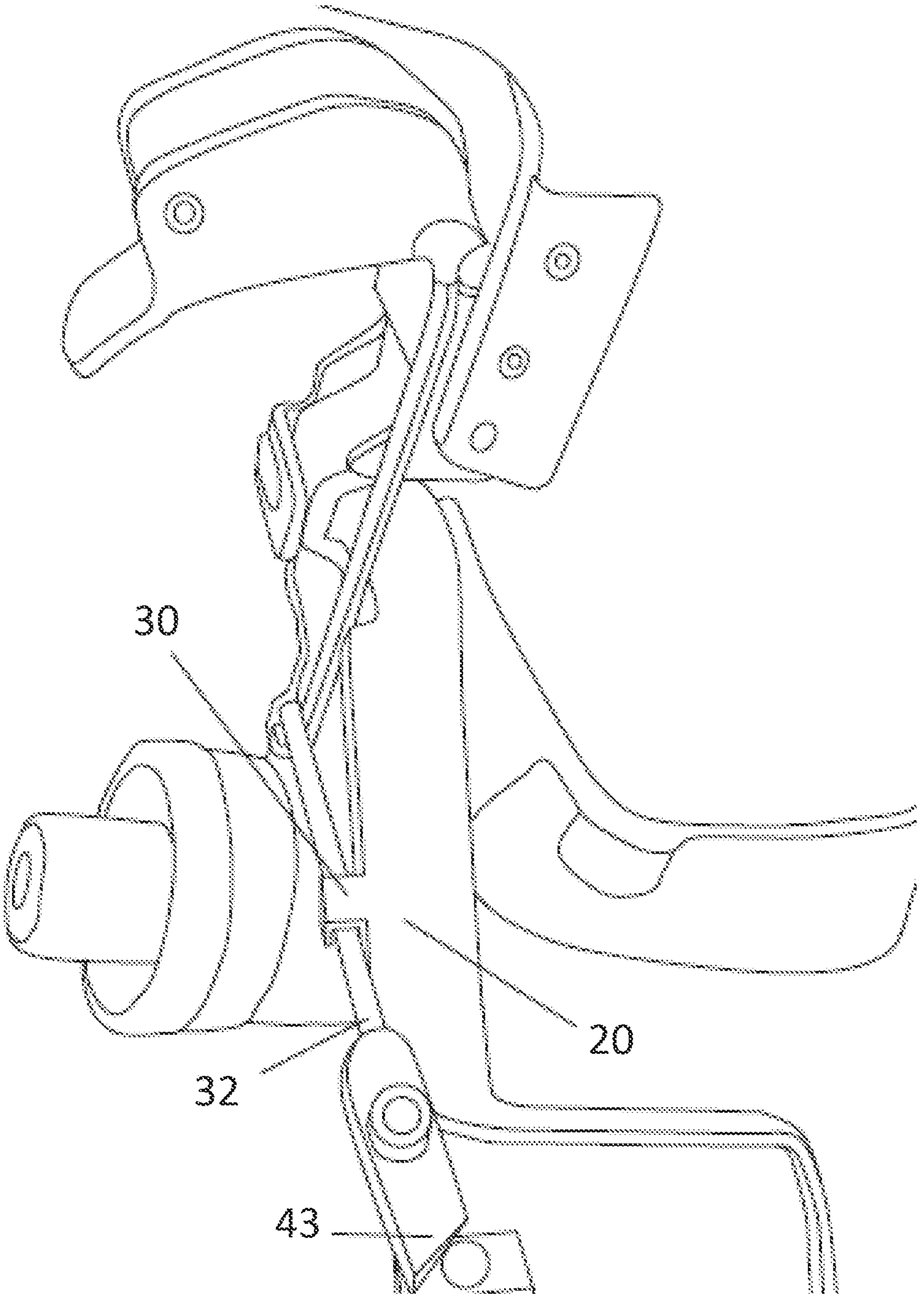
FIG. 3 is a partial perspective view of the clinch fastener system of FIG. 1. showing the safety trigger lockout mechanism in a locked position.
Figure 4:
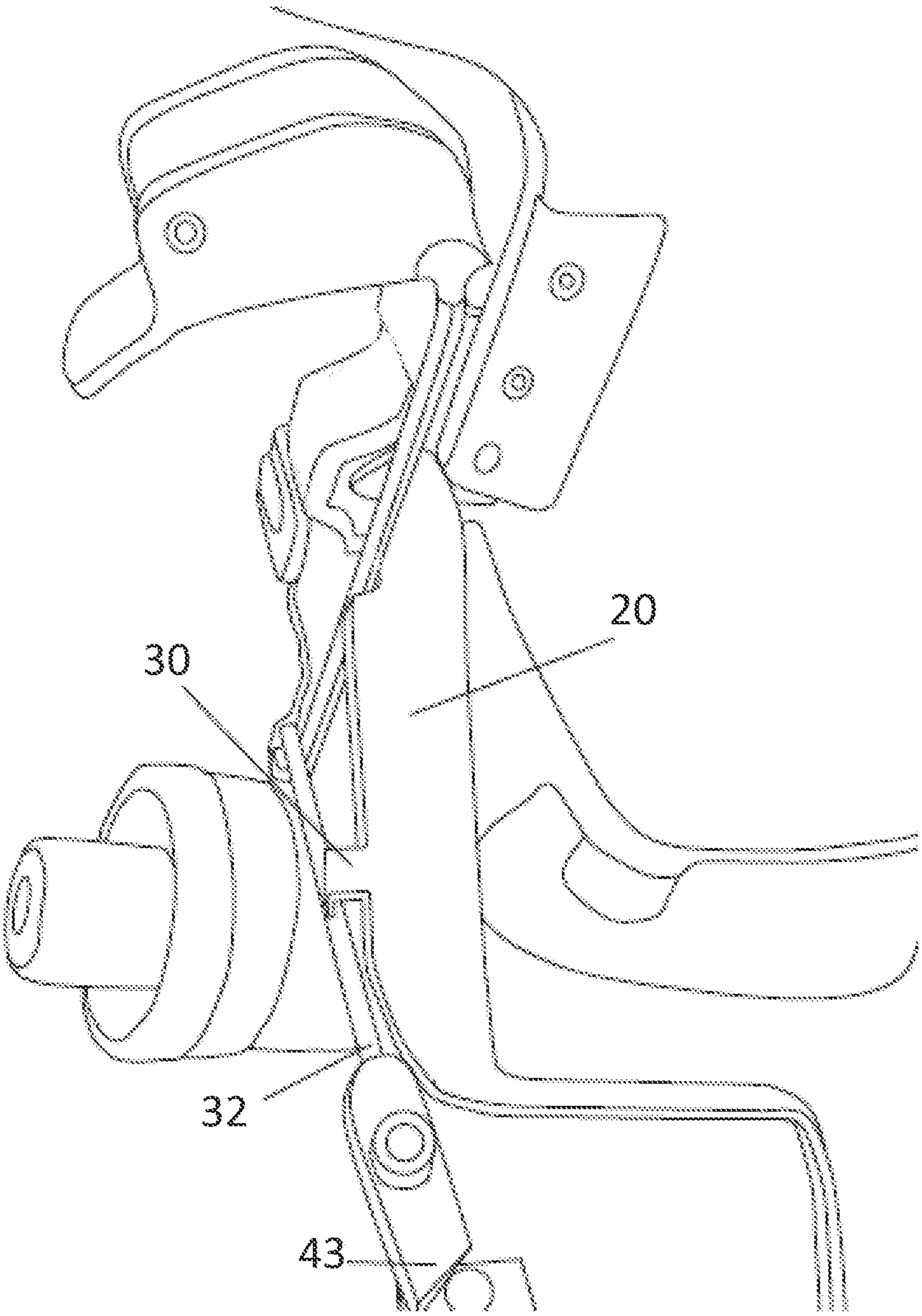
FIG. 4 is a partial perspective view of the clinch fastener system of FIG. 1. showing the safety trigger lockout mechanism in an unlocked position.
Figure 5:
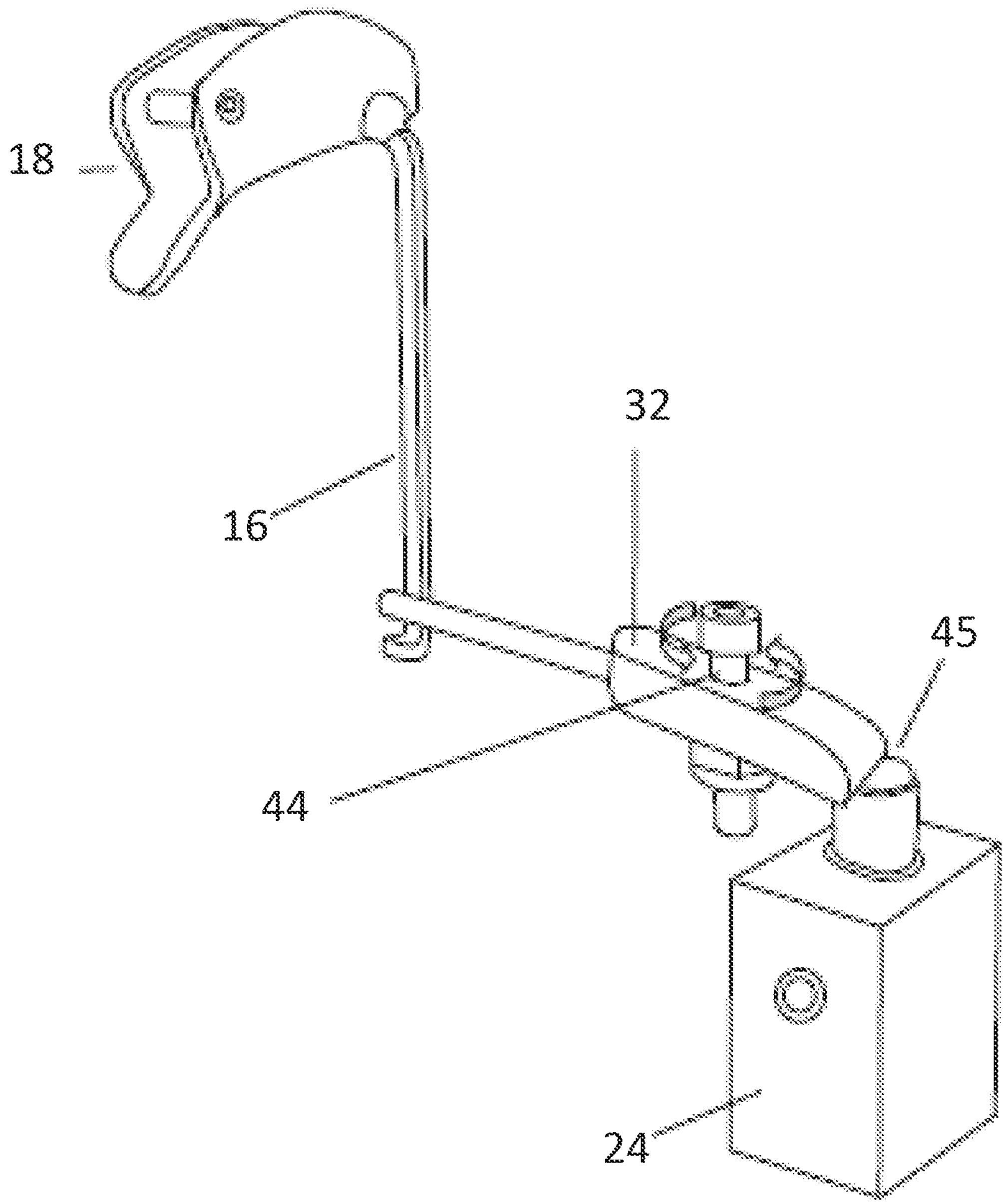
FIG. 5 is a partial perspective view of the clinch fastener system of FIG. 1. showing the mechanical trigger linkage system in a not actuated position.
Figure 6:
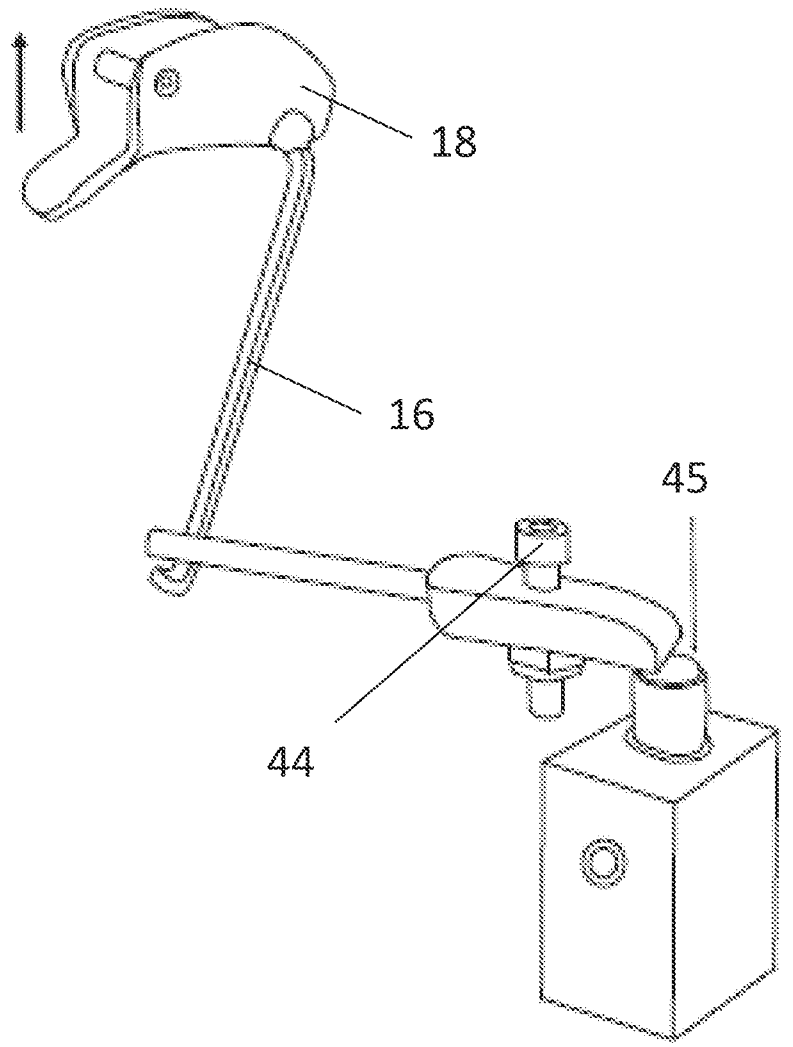
FIG. 6 is a partial perspective view of the clinch fastener system of FIG. 1. showing the mechanical trigger linkage system an actuated position.

When safety trigger lockout mechanism 20 is not being depressed onto the work surface, it is in a lowered position (FIG. 3). In this lowered state, the lockout flange 30 of the safety trigger mechanism 20 is lowered around the pneumatic valve actuating arm 32, thereby mechanically preventing it from pivoting about pivot 44 when the user pulls on the trigger 18.

Because integrated actuator arm 16 is what applies force to pneumatic valve actuating arm 32 when the user pulls trigger 18, it cannot move in this locked position when safety trigger lockout mechanism 20 and its lockout flange 30 are lowered and not depressed.

In other words, to cause a clinch to happen, the user depresses the tool nose 26, which pushes the safety trigger lockout mechanism 20 up which releases the integrated actuator arm 16. The user then depresses the trigger 18, which causes the integrated actuator arm 16 to move in conjunction with the trigger's 18 rotating motion, which pushes the pneumatic valve actuating arm 32, which pivots about pivot 44, and as it pivots, the angled end 43 of it pushes the pneumatic valve button 45 down (FIG. 6) and in, allowing for airflow to be released to actuate the clinch arm 14 about pivot 40.

Figure 9:
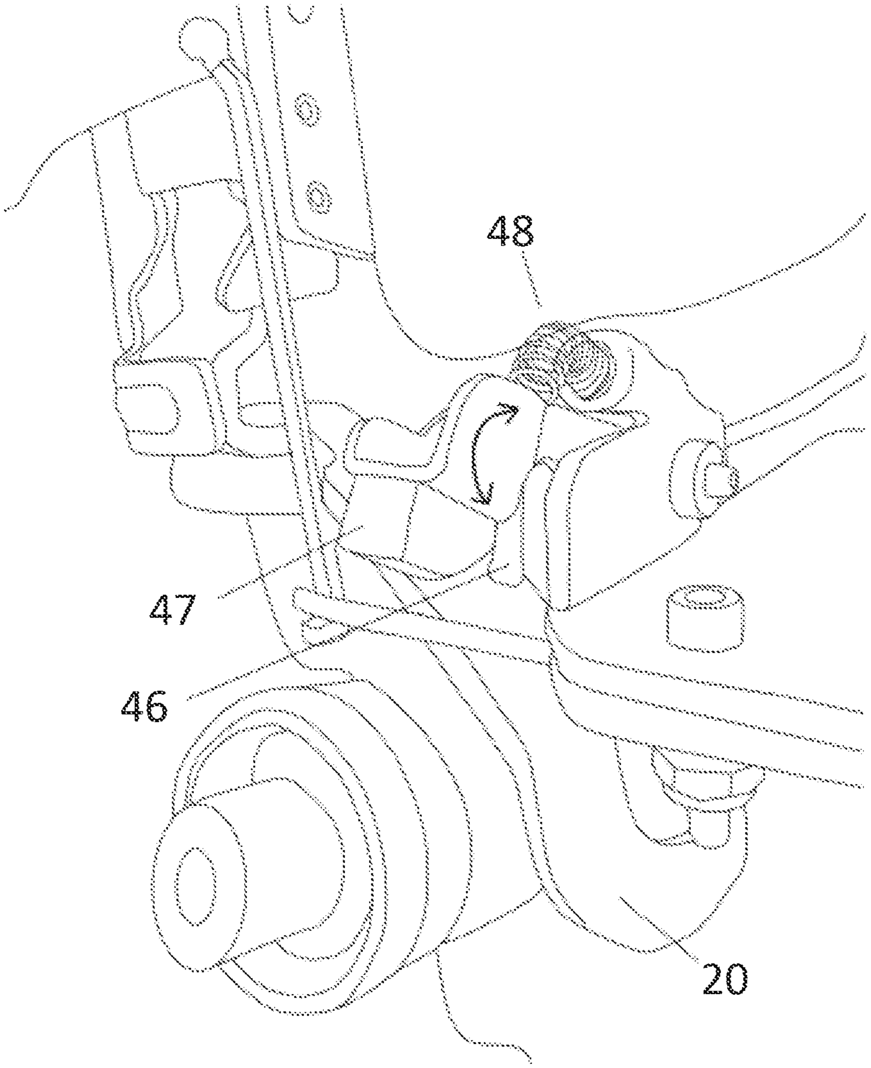
FIG. 9 is a partial perspective view of the clinch fastener system of FIG. 1. showing the hinging lockout catch mechanism in an unlocked position.
Figure 10:
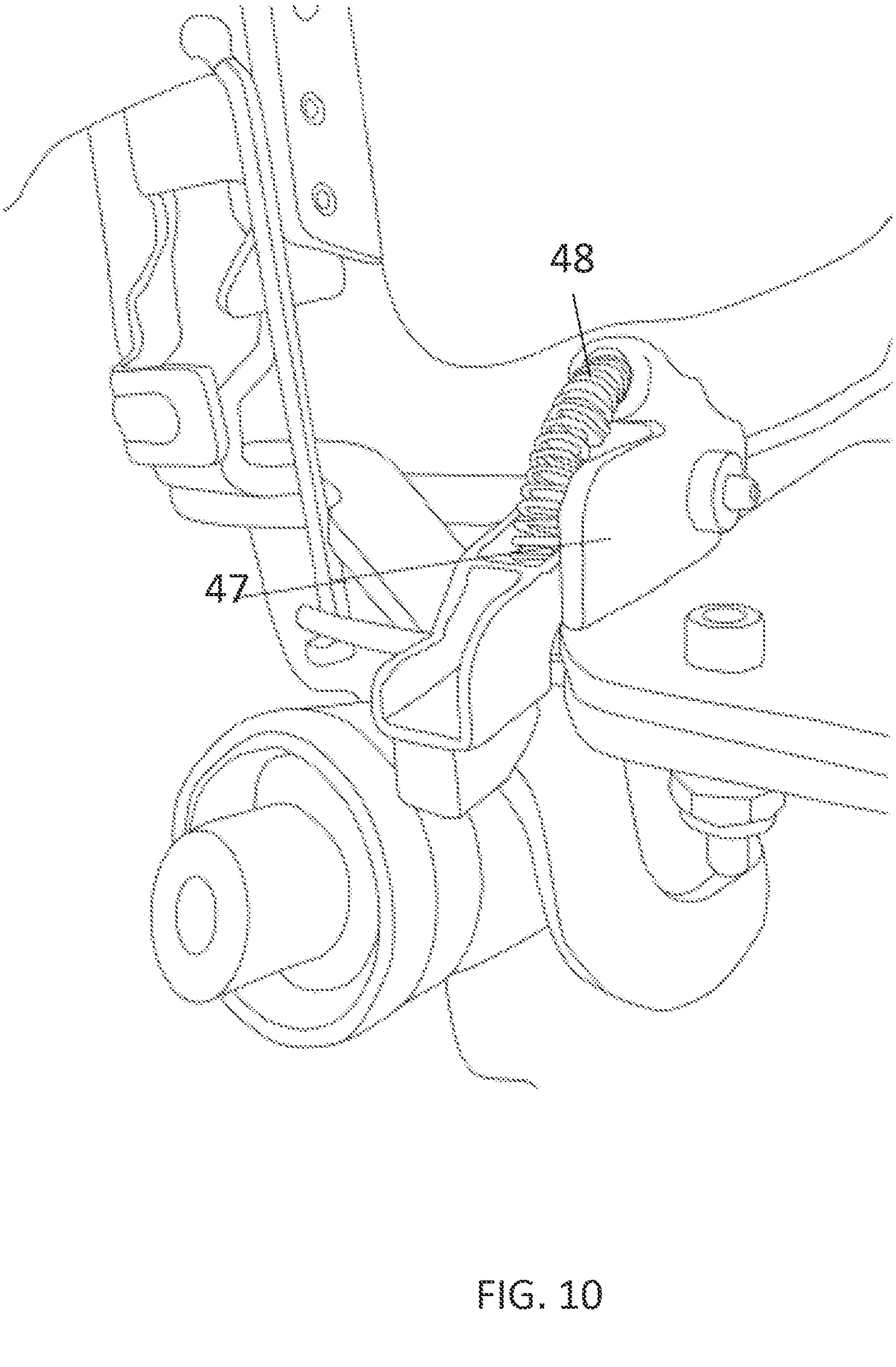
FIG. 10 is a partial perspective view of the clinch fastener system of FIG. 1. showing the hinging lockout catch mechanism in an unlocked position.

Referring to FIGS. 9-10, an alternative embodiment is shown. In this embodiment, a hinging lockout catch mechanism 47 captures the pneumatic valve actuating arm 32 in the same way the lockout flange 30 on the safety trigger lockout mechanism 20 captures it.

The difference is that it is not a flange integrated into the safety trigger lockout mechanism 20, but a separate part that is actuated by the same motion of depressing the tool nose 26 of the pneumatic fastener tool 11 into the work surface. When the user depresses the nose 26 of the tool, and causes the safety trigger lockout mechanism 20 to rise, a safety trigger lockout mechanism catch post 46 contacts the hinging lockout catch mechanism 47, and causes it to rise as well. When the user no longer depresses the nose 26 of the tool, the spring 48 of the hinging lockout catch mechanism 47 returns it to its down and locked position over the pneumatic valve actuating arm 32.

The embodiments of FIGS. 1-10 include the use of mechanical linkage integrated into a trigger 18 for the purposes of activating a clinch sequence in a pneumatic fastening tool 11. The trigger 18 being pulled sequentially activating clinch arm 14 prior to the fastener being fired from the tool 11, thereby allowing the clinch plate 17 of the clinch arm 14 to be in the upward clinch position, prior to the fastener being driven through the clinched material into the clinch plate 17. A clinch is made to happen via the mechanical pulling of the trigger 18. The trigger 18 is mechanically locked by the position of the safety trigger lockout mechanism 20. The safety trigger lockout mechanism 20 is released by the depressing of the tool 11 into the work surface.

Figure 11:
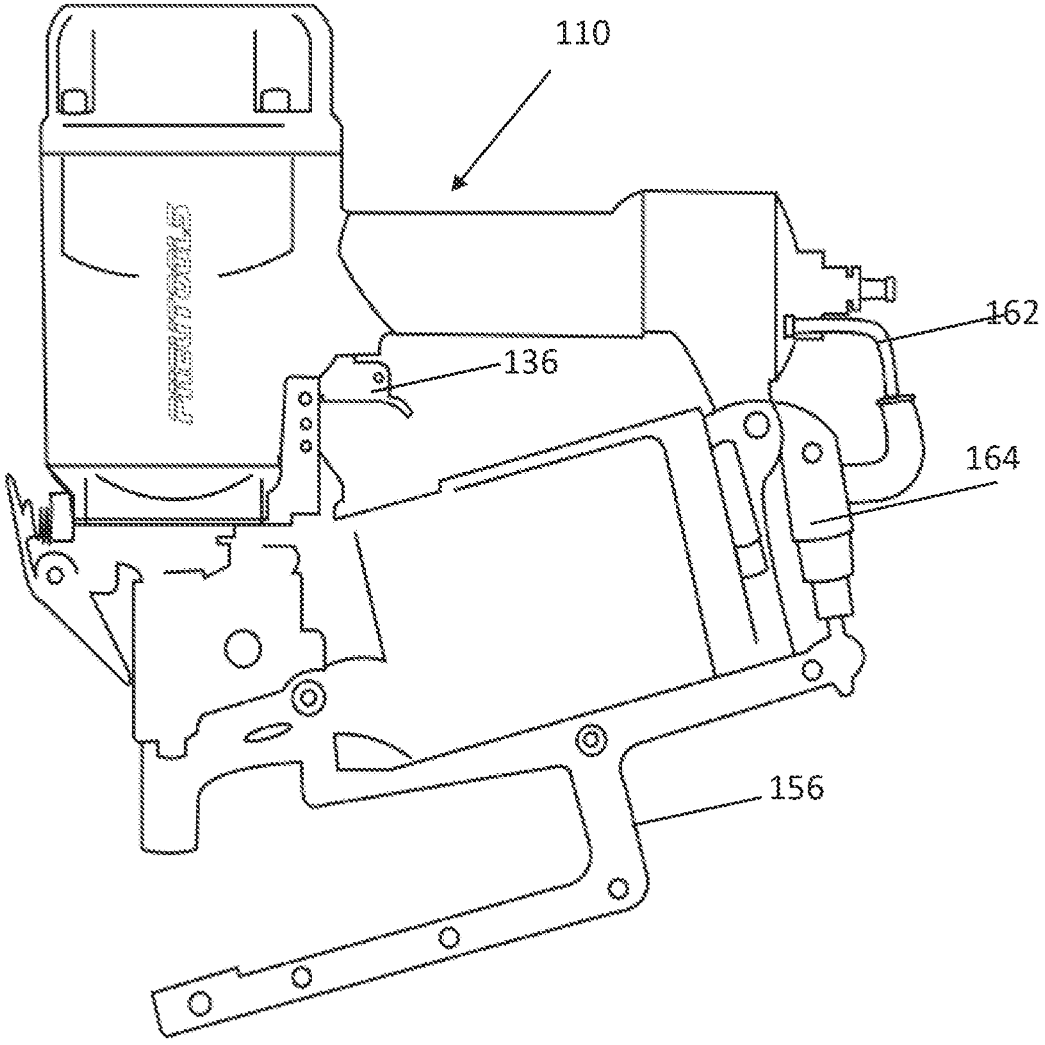
FIG. 11 is a side view of a clinch fastener system according to embodiments of the disclosure.
Figure 12:
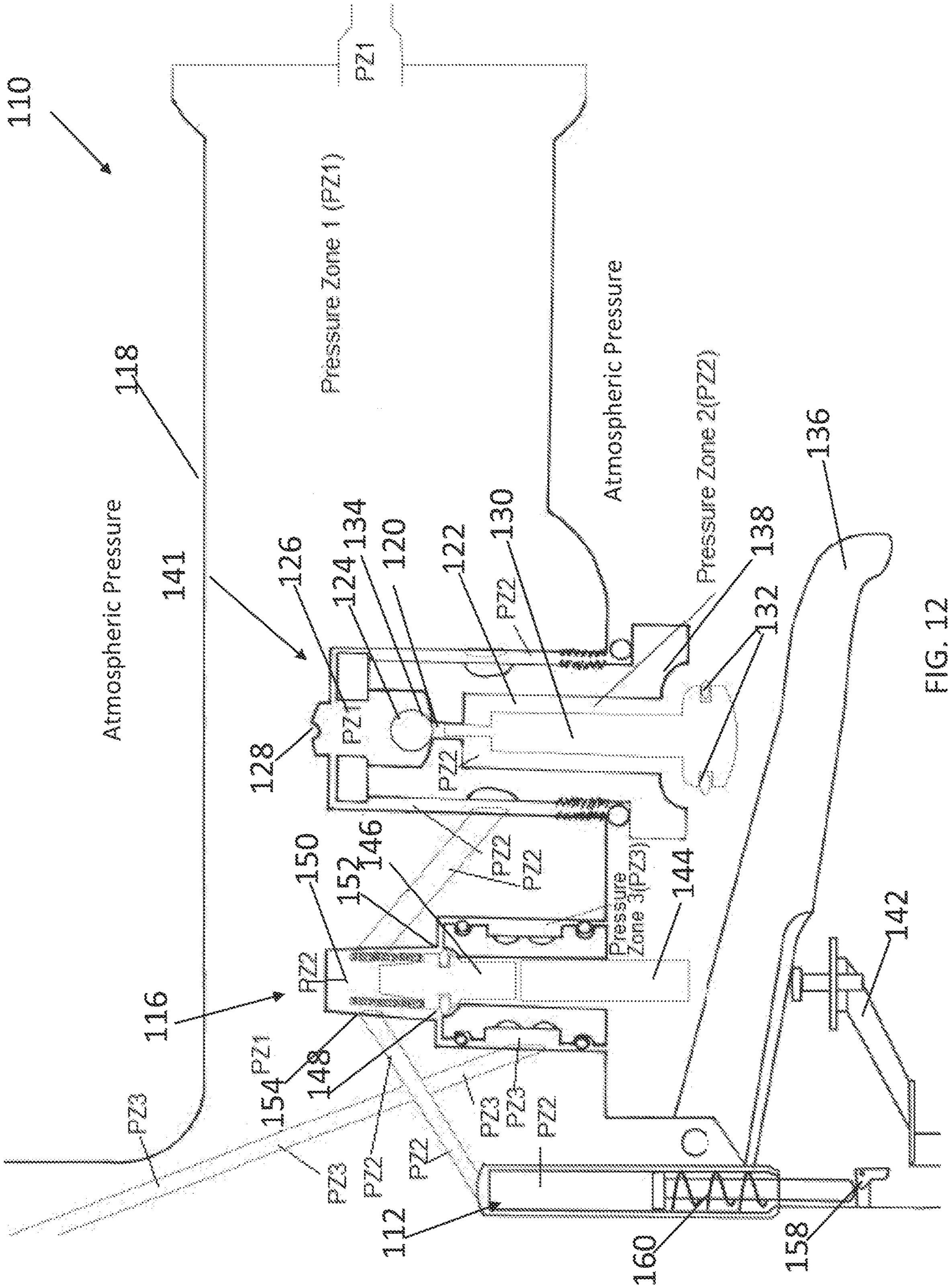
FIG. 12 is a partial perspective view of the clinch fastener system of FIG. 11.
Figure 13:
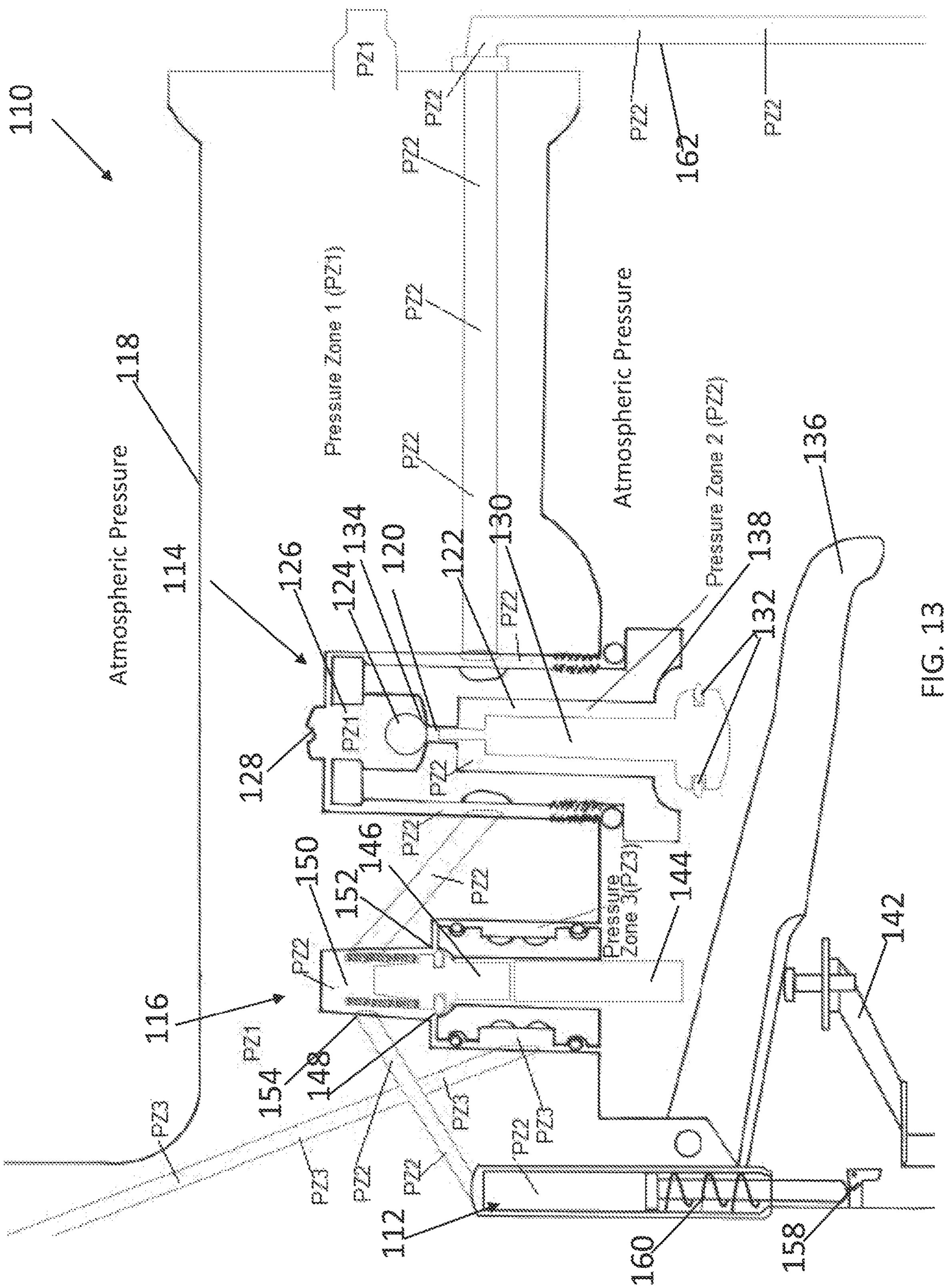
FIG. 13 is a partial perspective view of the clinch fastener system of FIG. 11.

Referring to FIGS. 11-13, the disclosed embodiments include a pneumatic fastener tool 110 having an integrated piston 112 in addition to a trigger valve 114 and a safety valve 116 of a two-trigger valve system which moves pressure throughout three specific pressure zones PZ1, PZ2 and PZ3. The first pressure zone PZ1 has pressure introduced to it by a user attaching the tool 110 to a pneumatic pressure delivery source, such as a compressor or other source. Once the source of pressure has been attached, the first zone PZ1 is pressurized. When the first zone PZ1 is pressurized, the handle 118 of the tool 110 is filled with air pressure, and a hole 120 in the top of the chamber 122 of the trigger valve 114 allows that air pressure to enter and force a sealing ball 124 in in a second chamber 126 to seal against another hole 128 that leads down to the second pressure zone PZ2.

In pressure zone two PZ2, there is the trigger valve 114 with holes (120, 122, 126, 28) drilled through it that allows air to pass through, and a valve plunger 130 with seals 132 on it that moves up and down to push the ball seal 124 off its seat 134 to allow the pressurized air from zone one PZ1 to pass into zone two PZ2. For zone two PZ2 to become pressurized, a user must depress the trigger 136 of the tool 110. When the user depresses the trigger 136 of the tool 110, it pushes the valve plunger 130 that is inside of the trigger valve 114 with the holes (120, 122, 126, 128) up, and seals against the bottom 138 of the valve chamber 122 that is open to room atmosphere otherwise. As the valve plunger 130 seals against bottom 138 of the trigger valve 114 and pushes the ball seat 124 up off its seat 134, pressurized air rushes in from pressure zone one PZ1, and fills all of pressure zone two PZ2 while the trigger 136 remains depressed.

Pressure zone three PZ3 receives pressure when the user of the tool 110 depresses the safety mechanism 142. As the safety mechanism 142 is depressed, it contacts the trigger safety 144, and pushes it up through the safety valve 116. As it travels up through the safety valve 116, it contacts the valve plunger 146 that is sprung down and sealed against the opening 148 in the safety valve chamber 150 between pressure zones two PZ2 and three PZ3. When the valve plunger 146 is pushed up from its seat 152, pressurized air rushes into the zone three PZ3 areas of the tool 110, and the piston assembly 112 is activated by one cycle. Pressure zone one PZ1 includes the interior of handle 118 and chamber 126. Pressure zone two PZ2 includes chamber 122, top portion of safety valve chamber 150, and an integrated piston 112 (discussed below) and the tubings therebetween. Pressure zone three PZ3 include the bottom portion of safety valve chamber 150 and tubing leading to actuate pneumatic fastener tool 110 to drive a fastener.

The disclosed embodiments uses pressure zone two PZ2 to activate an integrated air piston 112. Activating an integrated air piston 112 off of the second pressure zone PZ2 allows for the tool 110 to have additional and safer features, without sacrificing quality of the tool 110, or adding great expense to the tool 110 by adding significantly more parts. The adding of this attachment to pressure zone two PZ2 is accomplished by either tapping into it directly, or drilling an additional port 154 through its location to divert the pressure to the integrated air piston 112. The integrated air piston 112 can then be used to drive a safety, clinch fastener mechanism 156 such as the one discussed above, or other additional function on the tool, for example.

In FIGS. 11-13 is an example of the integrated piston 112 in the internal workings of the housing, powered by the air in pressure zone two PZ2. When the user depresses the trigger 136, the air rushes through the port 154 to the integrated piston 112, pushing it down to either a mechanical dog 158 that rotates in place, or it is attached to a bracket on the piston 112 itself, all for the purposes of mechanically locking out the safety mechanism 142. The benefits of utilizing the integrated piston 112 for a mechanical lockout of the safety mechanism 142 is that it reduces the risk in comparison to traditional sequential triggers substantially. Since the lockout is stopping the safety mechanism 142 from moving to hit the valve plunger 146 of the safety valve 116, it cannot mechanically fire a fastener in any way, and double fires because of a lack of recoil do not happen like they do in the traditional sequential trigger designs. For the user to fire a tool 110 with the air-assisted safety of the disclosed embodiments, they must first depress the safety mechanism 142, and then fire the tool 110. Once the tool 110 has fired, the piston 112 returns by spring 160 force back to the top of its stroke. The air pressure has drained off of the pressure zone two PZ2, and a second shot is not possible, even when it does not recoil.

In FIG. 13 is an example of a tube 162 running from the trigger valve back through the handle 118 of the tool 110 to the outside. This tube 162 allows air to be brought outside of the tool 110 to power multiple features if needed. One being a clinch arm 156. When the trigger 136 of the tool 110 is depressed, air rushes into the second pressure zone PZ2, back through a tube 162 inside the handle 118 of the tool 110, and out the tool 110 to an external air cylinder 164 that operates a clinch arm 156 on a clinch nailer. This allows the clinch action of the tool 110 to happen prior to the firing of the fastener, which is necessary for getting the clinch arm 156 to the top of its stroke before a fastener hits the clinch arm plate. Operating additional pneumatic valves and pistons off of the second pressure zone PZ2 in a two trigger valve tool allows for many benefits and features to be added that have not been on pneumatic tools until now. The pressure zones of FIG. 13 are located as in FIG. 12, and in addition, tube 162 is pressure zone PZ2.

Figure 14:
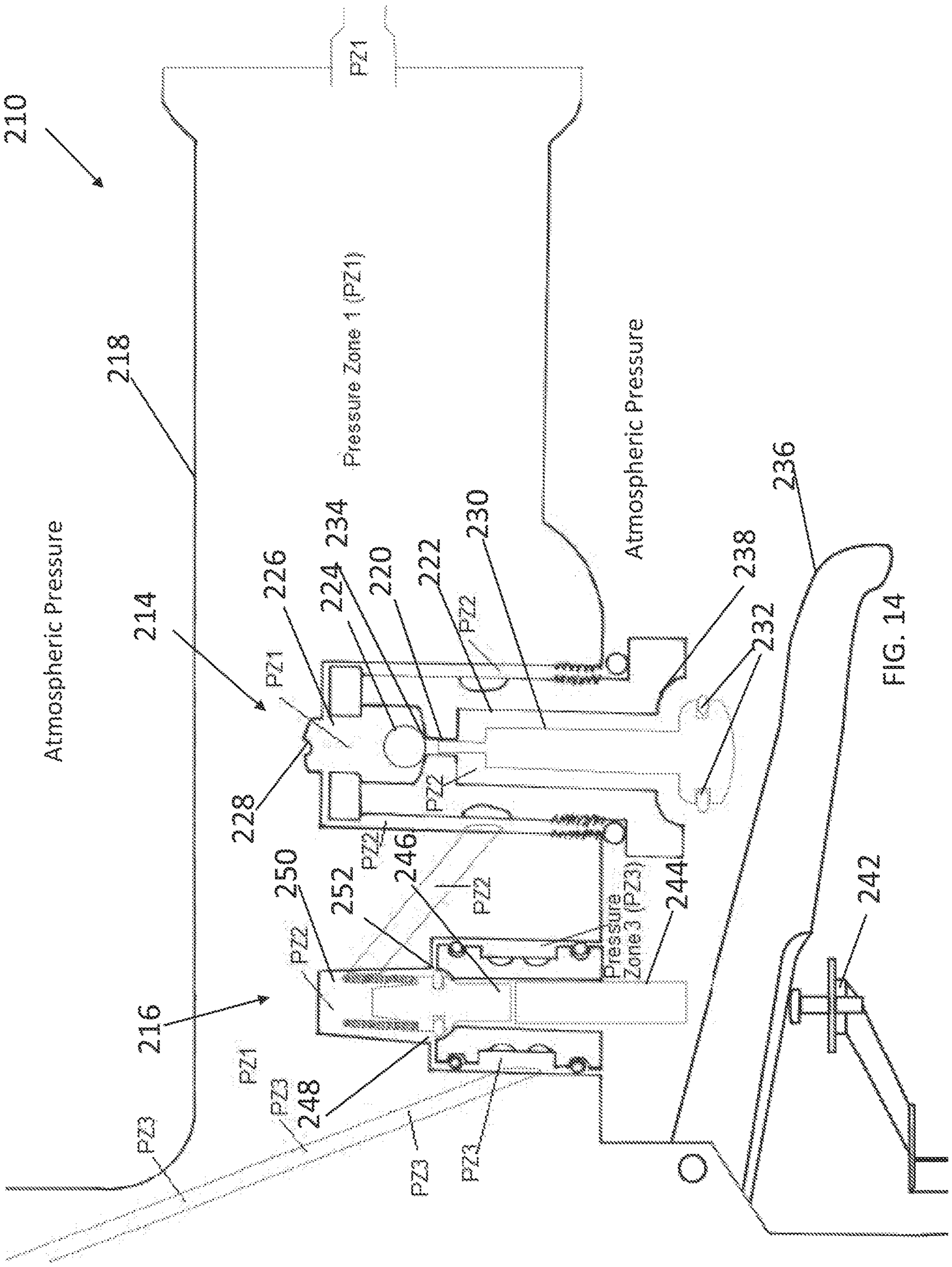
FIG. 14 is a side view of a clinch fastener system according to embodiments of the disclosure.
Figure 15:
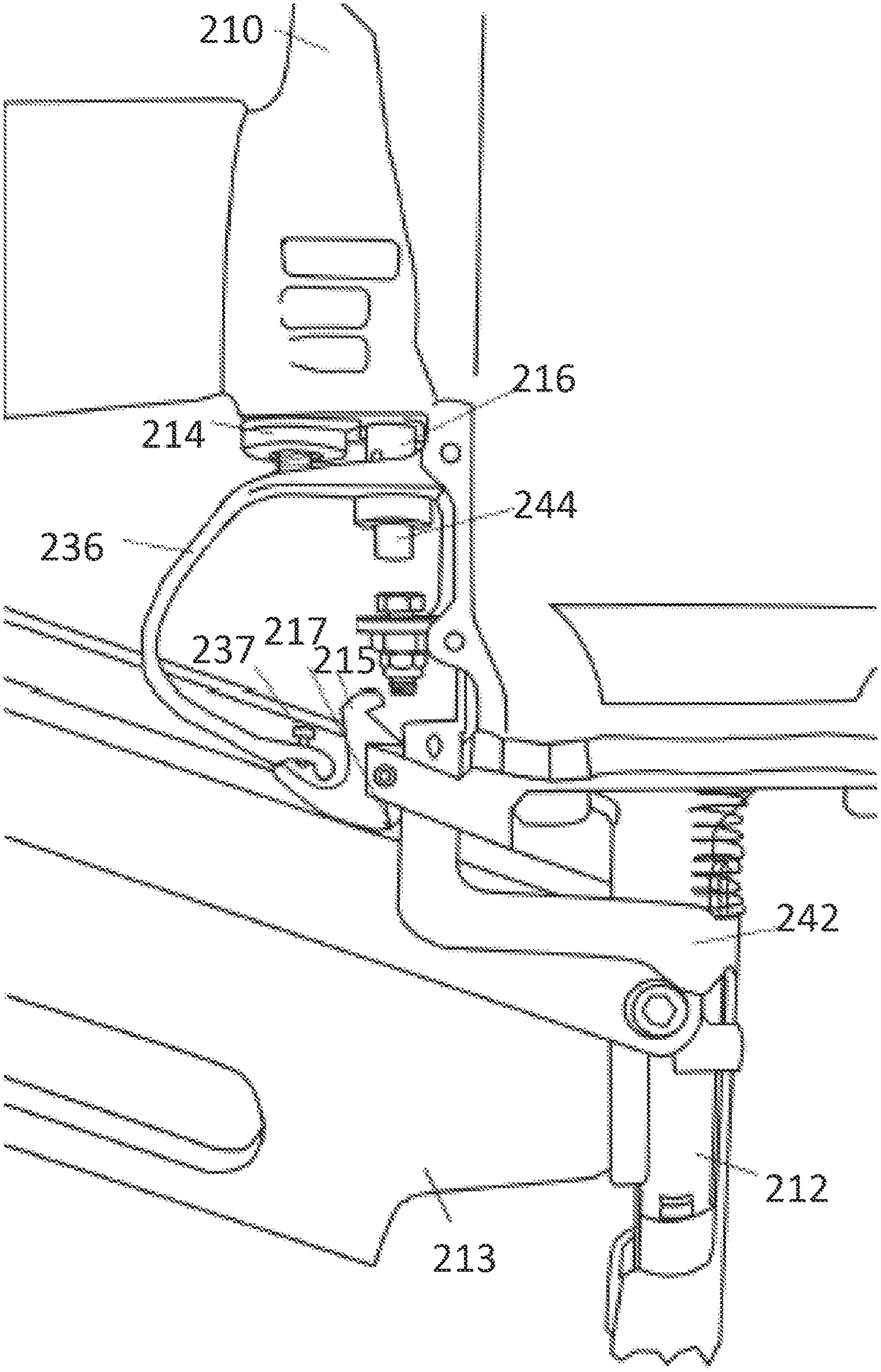
FIG. 15 is a partial perspective view of the clinch fastener system of FIG. 14.

Referring to FIGS. 14-15, the disclosed embodiments include a tool 210 having a trigger valve 214 and a safety valve 216 of a two-trigger valve system operating through three pressure zones PZ1, PZ2, PZ3 as discussed above. The system operates by first having a user pressurize the tool 210 by attaching a source of pneumatic pressure. Once the source of pressure has been attached, the first zone PZ1 is pressurized. When the first zone PZ1 is pressurized, the handle 218 of the tool 210 is filled with air pressure, and a hole 220 in the top of the chamber 222 of the trigger valve 214 allows that air pressure to enter and force a sealing ball 224 in second chamber 226 to seal against another hole 228 that leads down to the second pressure zone PZ2.

In pressure zone two PZ2, there is the trigger valve 214 with holes (220, 222, 226, 228) drilled through it that allows air to pass through, and a valve plunger 230 with seals 232 on it that moves up and down to push the ball seal off its seat 234 to allow the pressurized air from zone one PZ1 to pass into zone two PZ2. For zone two PZ2 to become pressurized, a user must depress the trigger 236 of the tool 210. When the user depresses the trigger 236 of the tool 210, it pushes the valve plunger 230 that is inside of the trigger valve 214 with the holes (220, 222, 226, 228) up, and seals against the bottom 238 of the valve chamber 222 that is open to room atmosphere otherwise. As the valve plunger 230 seals against bottom 238 of the trigger valve 214 and pushes the ball seat 224 up off its seat 234, pressurized air rushes in from pressure zone one PZ1, and fills all of pressure zone two PZ2 while the trigger 236 remains depressed.

Pressure zone three PZ3 receives pressure when the user of the tool 210 depresses the safety mechanism 242. As the safety mechanism 242 is depressed, it contacts the trigger safety 244, and pushes it up through the safety valve 216. As it travels up through the safety valve 216, it contacts the valve plunger 46 that is sprung down and sealed against the opening 248 in the safety valve chamber 250 between pressure zones two PZ2 and three PZ3. When the valve plunger 246 is pushed up from its seat 252, pressurized air rushes into the zone three PZ3 areas of the tool 210, and the tool 210 is activated one cycle.

The embodiments of FIGS. 14-15 include an extended curve trigger 236 with externally sliding safety clasp or depressible button safety switch 237 to mechanically activate a rocking safety latch 215. Activating an extended curve trigger off of the rocking safety latch allows for the tool 210 to have additional and safer features, without sacrificing quality, functionality, or speed of the tool 210, or adding great expense to the tool 210 by adding significantly more parts. The adding of this attachment to tool 210 is accomplished by simply attaching it to the housing 211, nose 212, or magazine 213. The extended curve design of the trigger 236 provides an easy loop for the user to hold with his finger. This curved looping design helps to ensure that the rocking safety latch 215 mechanically locks out the safety mechanism 242 whenever a user is holding onto the trigger while not actively operating the tool.

In the drawings is an example of extended curve trigger 236 with the rocking safety latch 215 and depressible button safety switch 237. When the user depresses the extended curve trigger 236, the rocking safety latch 215 is released from being held back by the extended curve trigger 236 and has tension on it from a spring 217 that causes it to rock forward, all for the purposes of mechanically locking out the safety mechanism 242. The benefits of utilizing an extended curve trigger 236 and rocking safety latch 215 for a mechanical lockout of the safety mechanism 242 is that it reduces the risk in comparison to traditional sequential triggers substantially. Since the lockout is stopping the safety mechanism 242 from moving to hit the trigger safety 244, which then hits valve plunger 246 of the safety valve 216, it cannot mechanically fire a fastener in any way, and double fires because of a lack of recoil do not happen like they do in the traditional sequential trigger designs. For the user to fire a tool 210 with the mechanical lockout safety of the disclosed embodiments, they must first depress the safety mechanism 242, and then fire the tool 210. Once the tool 210 has fired, the rocking safety lockout returns to its position to lock out the safety mechanism once the tool is raised. The air pressure has drained off of the pressure zone two PZ2, and a second shot is not possible, even when it does not recoil.

In other words, the embodiment of FIGS. 14-15 is designed to prevent the trigger of a pneumatic fastener tool 210 from accidental or double firing. The embodiment includes a curved trigger 236, rocking safety latch 215, depressible button safety switch 237, and a safety mechanism 242 which is connected at the front end of the power tool. When the user depresses the trigger 236 without first moving the safety mechanism 242 (e.g. abutting against a surface), the rocking safety mechanism 215 rotates forward which catches and locks out the safety mechanism 242. See FIG. 15. This is done by the depressible button safety switch 237 pushing against a bar (not numbered) which pushes the rocking safety latch 215. Thus, in order to fire the tool, the safety mechanism 242 first needs to be depressed, then the trigger 236 can be pulled. Once the trigger is pulled, the safety mechanism 242 hits the trigger safety 244, which hits the plunger within the tool to fire the tool.

Typical sequential style triggers and trigger mechanisms operate when a mechanism of some type inside the trigger of the tool is moved to prevent the bump contact actuation of the safety valve. Switches have been added to the external part of the tool housing which can be switched to mechanically lockout trigger mechanisms, or switch them between firing modes, such as sequential or bump contact. The difficulty created by adding these safety mechanisms to the tool is that they effectively slow down the tool and cause it to be more expensive and difficult to repair, and they also add to the size of the trigger, making it more unwieldy for a user. Many sequential triggers that have the solution built into the trigger, or have an external housing switch solution, are not perfectly safe. Often, if the tool is held down tightly, and not allowed to recoil, the mechanisms in the trigger or external housing switch cannot function appropriately, and the tool can double fire, causing a nail to shoot on top of another nail and ricochet back towards the user. This often happens in tight areas, or awkward positions where the user is at even greater risk, and the size of the trigger being larger because of the mechanism being contained within said trigger causes the tool to be more unwieldy. In embodiments disclosed above, the air pressure has drained off of the pressure zone two PZ2, and a second shot is not possible, even when it does not recoil.

Features of the disclosed embodiments may be combined, rearranged, omitted, etc., within the scope of the invention to produce additional embodiments. Furthermore, certain features may sometimes be used to advantage without a corresponding use of other features.

Many alternatives, modifications, and variations are enabled by the present disclosure. While specific embodiments have been shown and described in detail to illustrate the application of the principles of the invention, it will be understood that the exemplary embodiments may be embodied otherwise without departing from such principles. Accordingly, Applicants intend to embrace all such alternatives, modifications, equivalents, and variations that are within the spirit and scope of the exemplary embodiments.

What is claimed is:

1. A clinch fastener system comprising:

a pneumatic fastener tool comprising a tool nose, a handle, a trigger, a trigger valve and a safety valve, the pneumatic fastener tool operating through three pressure zones comprising a first pressure zone, a second pressure zone and a third pressure zone, wherein the first pressure zone comprises an interior of the handle and a first portion of the trigger valve, wherein the second pressure zone comprises a second portion of the trigger valve, and a first portion of the safety valve comprising a first portion of a safety valve chamber, and wherein the third pressure zone comprises a second portion of the safety valve;

a pivoting base configured to be pivotally connected to the pneumatic fastener tool configured to dispense fasteners;

a clinch arm pivotally connected to the pivoting base at a proximal end of the clinch arm;

a trigger safety mechanism operatively attached to the nose of the pneumatic fastener tool and configured to be actuated by a user;

wherein the safety valve further comprises:

a trigger safety configured to be actuated by the trigger safety mechanism; and a safety valve plunger disposed within the safety valve chamber and configured to be moved within the safety valve chamber by actuation of the trigger safety by the trigger safety mechanism causing movement of the safety valve plunger to allow the pressurized air from the second pressure zone to enter the third pressure zone; and wherein the second pressure zone further comprises an integrated air piston separately moveable from the safety valve plunger, wherein the integrated air piston is configured to be moveable within an integrated air piston assembly and provide mechanical lockout of the trigger safety mechanism, wherein the first portion of the safety valve comprises a port configured to divert air from the first portion of the safety valve to the integrated air piston assembly.

2. The clinch fastener system of claim 1, wherein the interior of the handle is configured to be filled with pressurized air to pressurize the first pressure zone.

3. The clinch fastener system of claim 2, wherein the first portion of the trigger valve comprises a first chamber, and the second portion of the trigger valve comprises a second chamber which is configured to be open to atmospheric pressure prior to actuation of the trigger.

4. The clinch fastener system of claim 3, wherein the trigger valve further comprises:

a trigger valve sealing member configured to selectively seal an opening between the first chamber and the second chamber, and a trigger valve plunger disposed within the second chamber and configured to be moved within the second chamber by actuation of the trigger causing the trigger valve sealing member to unseal the opening between the first chamber and the second chamber allowing the pressurized air from the first pressure zone in the first chamber to fill the second pressure zone including the second chamber of the trigger valve while the trigger is actuated.

5. The clinch fastener system of claim 4, wherein the trigger valve plunger is configured to seal the second chamber from atmospheric pressure when the trigger is actuated.

6. The clinch fastener system of claim 1, further comprising an air cylinder configured to operate the clinch arm, and tubing within the second pressure zone between the second portion of the trigger valve and the air cylinder to actuate the air cylinder.

7. The clinch fastener system of claim 1, further comprising an extended curved trigger configured to prevent accidental or double firing of the tool, comprising a curved loop configured to be graspable by a user and extending from the safety valve to a rocking safety latch configured to prevent accidental or double firing of the pneumatic fastener tool.

8. The clinch fastener system of claim 7, wherein the rocking safety latch is rotatable to a position mechanically locking out the safety mechanism, wherein the rocking safety latch is biased by a spring to the position locking out the safety mechanism.

9. The clinch fastener system of claim 8, wherein the extended curved trigger extends from the safety valve at a first end of the curved loop to the rocking safety latch at a second end of the curved loop.

10. The clinch fastener system of claim 9, wherein the second end of the curved loop is configured to block the rocking safety latch from rotation by the spring to the position mechanically locking out the safety mechanism, wherein when the user depresses the extended curved trigger without first depressing the safety mechanism, the rocking safety latch is configured to be released from being blocked by the extended curve trigger and the rocking safety latch is rotated by the spring to the position mechanically locking out the safety mechanism.

11. The clinch fastener system of claim 10, wherein the extended curve trigger further comprises a depressible button safety switch configured to mechanically activate the rocking safety latch.

12. The clinch fastener system of claim 1, further comprising a mechanically actuated trigger linkage attached to the trigger comprising an integrated actuator arm fixedly attached to the trigger and configured for movement therewith upon pivoting of the trigger about a pivot.

13. The clinch fastener system of claim 12, further comprising a pneumatic valve actuating arm operatively attached to the integrated actuator arm; and a clinch actuating valve configured to actuate the clinch arm, wherein the tool nose is configured to be depressed causing the safety trigger mechanism to move upwardly releasing the integrated actuator arm from the pneumatic valve actuating arm.

14. The clinch fastener system of claim 13, wherein, upon depression of the trigger, the integrated actuator arm is configured to move in conjunction with pivoting motion of the trigger pushing the pneumatic valve actuating arm to cause the pneumatic valve actuating arm to move about a pivot.

15. The clinch fastener system of claim 14, wherein the pneumatic valve actuating arm comprises an angled end configured to push on a pneumatic valve button operatively connected to the clinch actuating valve to actuate the clinch arm.

* * * * *